US012243486B2

(12) United States Patent
Yuan et al.

(10) Patent No.: US 12,243,486 B2
(45) Date of Patent: Mar. 4, 2025

(54) PIXEL CIRCUITS AND DRIVING METHODS THEREOF, DISPLAY PANELS AND DISPLAY APPARATUSES

(71) Applicants: Chengdu BOE Optoelectronics Technology Co., Ltd., Sichuan (CN); BOE Technology Group Co., Ltd., Beijing (CN)

(72) Inventors: Changlong Yuan, Beijing (CN); Yingsong Xu, Beijing (CN); Xiaoxiao Wang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 11 days.

(21) Appl. No.: 17/914,192

(22) PCT Filed: Oct. 28, 2021

(86) PCT No.: PCT/CN2021/126897

§ 371 (c)(1),
(2) Date: Sep. 23, 2022

(87) PCT Pub. No.: WO2022/179153

PCT Pub. Date: Sep. 1, 2022

(65) Prior Publication Data

US 2023/0120335 A1 Apr. 20, 2023

(30) Foreign Application Priority Data

Feb. 26, 2021 (CN) ......................... 202110221188.2

(51) Int. Cl.
*G09G 3/325* (2016.01)
*G09G 3/20* (2006.01)
*G09G 3/36* (2006.01)

(52) U.S. Cl.
CPC ........... *G09G 3/325* (2013.01); *G09G 3/2025* (2013.01); *G09G 3/3659* (2013.01); *G09G 2300/0408* (2013.01)

(58) Field of Classification Search
None
See application file for complete search history.

(56) References Cited

U.S. PATENT DOCUMENTS

2009/0078853 A1* 3/2009 Lin ..................... G09G 3/3426 250/205
2015/0049046 A1 2/2015 Tan et al.
(Continued)

FOREIGN PATENT DOCUMENTS

CN 103310734 A 9/2013
CN 103325341 A 9/2013
(Continued)

OTHER PUBLICATIONS

CN2021102211882 first office action.
PCT/CN2021/126897 international search report.
PCT/CN2021/126897 Written Opinion.

*Primary Examiner* — Christopher R Lamb
(74) *Attorney, Agent, or Firm* — IPro, PLLC

(57) ABSTRACT

A pixel circuit, a driving method thereof, a display panel and a display apparatus are provided. The pixel circuit includes a light-emitting element, a first voltage terminal, a data signal line, a light emission control sub-circuit, and a photoelectric sensing sub-circuit. The light emission control sub-circuit is connected with the first voltage terminal, the data signal line and the light-emitting element. The photoelectric sensing sub-circuit is connected with the first voltage terminal and the data signal line.

7 Claims, 10 Drawing Sheets

(56) References Cited

U.S. PATENT DOCUMENTS

| | | | |
|---|---|---|---|
| 2016/0246422 | A1 | 8/2016 | Tan et al. |
| 2016/0291743 | A1* | 10/2016 | Yang .................. H10K 59/1213 |
| 2019/0279566 | A1 | 9/2019 | Wang et al. |
| 2020/0042759 | A1 | 2/2020 | Kim et al. |
| 2020/0077041 | A1 | 3/2020 | Oh et al. |
| 2021/0366382 | A1 | 11/2021 | Xu |

FOREIGN PATENT DOCUMENTS

| | | | |
|---|---|---|---|
| CN | 103325342 | A | 9/2013 |
| CN | 107204172 | A | 9/2017 |
| CN | 109841189 | A | 6/2019 |
| CN | 110795983 | A | 2/2020 |
| CN | 110876028 | A | 3/2020 |
| CN | 112951153 | A | 6/2021 |

* cited by examiner

PIXEL CIRCUITS AND DRIVING METHODS THEREOF, DISPLAY PANELS AND DISPLAY APPARATUSES

CROSS-REFERENCE TO RELATED APPLICATIONS

The present disclosure is a US national phase of PCT application No. PCT/CN2021/126897 filed on Oct. 28, 2021, which claims the priority of the Chinese Patent Application No. CN202110221188.2, filed on Feb. 26, 2021, the entire contents of which are incorporated herein by reference.

TECHNICAL FIELD

The present disclosure relates to the field of display technologies and in particular to a pixel circuit and a driving method thereof, a display panel and a display apparatus.

BACKGROUND

In the related arts, light sensors are usually disposed under a display panel or in a bezel region. In this case, it is difficult to reduce an area of the bezel region or a thickness of the display panel. To realize narrow bezel or reduce the thickness of the display panel while achieving optical detection functions, light sensors and pixel circuits can be integrated together. However, more sensing signal lines are needed to transmit sensing data, increasing difficulty of circuit board layout.

SUMMARY

The present disclosure provides a pixel circuit and a driving method thereof, a display panel and a display apparatus to address shortcomings in the related arts.

According to a first aspect of embodiments of the present disclosure, there is provided a pixel circuit, including:

- a light-emitting element;
- a first voltage terminal;
- a data signal line;
- a light emission control sub-circuit, connected with the first voltage terminal, the data signal line and the light-emitting element;
- a photoelectric sensing sub-circuit, connected with the first voltage terminal and the data signal line;
- where, in a first time period, the data signal line is configured to transmit a display data signal for controlling the light emission control sub-circuit to provide a drive current for the light-emitting element;
- in a second time period, the data signal line is configured to transmit a sensing data signal obtained by the photoelectric sensing sub-circuit.

In an embodiment, the photoelectric sensing sub-circuit includes a light-sensing element and a switching element, and the light-sensing element and the switching element are connected in series between the first voltage terminal and the data signal line;

- in the first time period, the switching element is in an open state;
- in the second time period, the switching element is in a closed state.

In an embodiment, the light-sensing element is a first transistor, which is in an open state.

In an embodiment, the light-sensing element is a diode, which is in an open state.

In an embodiment, the photoelectric sensing sub-circuit further includes a first capacitor, and the first capacitor is connected in parallel on both ends of the diode, or connected in parallel on opposite ends of the diode and the switching element.

In an embodiment, the switching element is a second transistor.

In an embodiment, the light emission control sub-circuit includes a data write sub-circuit, a drive sub-circuit and a reset sub-circuit;

- the data write sub-circuit includes a data signal input terminal for receiving the display data signal and a first power supply signal input terminal for receiving a first power supply signal, the data write sub-circuit is connected with a connection node which is connected with the drive sub-circuit, and the data signal input terminal is connected with the data signal line;
- the drive sub-circuit is connected with the first power supply signal input terminal and the light-emitting element, and configured to provide a drive current for the light-emitting element;
- the light-emitting element is further connected with a second power supply signal input terminal for receiving a second power supply signal; the second power supply signal has a lower level than the first power supply signal;
- the reset sub-circuit includes a reset control terminal for receiving a reset signal and a third power supply signal input terminal for receiving a third power supply signal, and the reset sub-circuit is connected with the connection node; the third power supply signal has a lower level than the first power supply signal.

In an embodiment, the first voltage terminal is configured to provide the first power supply signal, and the first power supply signal input terminal is connected with the first voltage terminal;

- a first electrode of the first transistor is connected with the first voltage terminal, a second electrode of the first transistor is connected with the data signal line through the switching element, and a gate electrode of the first transistor is connected with the first electrode, or,
- the gate electrode of the first transistor is connected with the second electrode, or,
- the gate electrode of the first transistor is configured to input a switch-off signal for controlling the first transistor to be in an open state.

In an embodiment, the first voltage terminal is configured to provide the second power supply signal and the second power supply signal input terminal is connected with the first voltage terminal;

- a first electrode of the first transistor is connected with the data signal line, a second electrode of the first transistor is connected with the first voltage terminal through the switching element, and a gate electrode of the first transistor is connected with the first electrode, or,
- the gate electrode of the first transistor is connected with the second electrode, or,
- the gate electrode of the first transistor is configured to input a switch-off signal for controlling the first transistor to be in an open state.

In an embodiment, the first voltage terminal is configured to provide the third power supply signal, and the third power supply signal input terminal is connected with the first voltage terminal;

- a first electrode of the first transistor is connected with the data signal line, a second electrode is connected with the first voltage terminal through the switching element, and a gate electrode of the first transistor is connected with the first electrode, or, the gate electrode of the first transistor is connected with the second electrode, or, the gate electrode of the first transistor is configured to input a switch-off signal for controlling the first transistor to be in an open state.

In an embodiment, the light emission control sub-circuit further includes a first light emission control sub-circuit and a second light emission control sub-circuit;

a first terminal of the first light emission control sub-circuit is connected with the first power supply signal input terminal, a second terminal is connected with the drive sub-circuit, and a control terminal is configured to receive a light emission control signal;

a first terminal of the second light emission control sub-circuit is connected with the drive sub-circuit, a second terminal is connected with the light-emitting element, and a control terminal is configured to receive the light emission control signal.

According to a second aspect of embodiments of the present disclosure, there is provided a display panel, including the above pixel circuit.

According to a third aspect of embodiments of the present disclosure, there is provided a method of driving a pixel circuit to drive the above pixel circuit. The method includes:

in a first time period, outputting, by the data signal line, the display data signal to the light emission control sub-circuit to control the light emission control sub-circuit to provide a drive current for the light-emitting element;

in a second time period, obtaining, by the photoelectric sensing sub-circuit, the sensing data signal and outputting the sensing data signal through the data signal line.

In an embodiment, the photoelectric sensing sub-circuit includes a light-sensing element and a switching element, and the light-sensing element and the switching element are connected in series between the first voltage terminal and the data signal line; the light-sensing element is in an open state and the light-sensing element is a first transistor or a diode; in the second time period, obtaining, by the photoelectric sensing sub-circuit, the sensing data signal includes:

in the second time period, controlling the switching element to be in a closed state;

in a case of no illumination, generating, by the light-sensing element, a dark current which is the sensing data signal;

in a case of illumination, further generating, by the light-sensing element, a photo-generated current, where the sensing data signal includes the dark current and the photo-generated current.

As can be known from the above embodiments, the photoelectric sensing sub-circuit for sensing external inputs is integrated in the pixel circuit, the data signal line is used to transmit the sensing data signal obtained by the photoelectric sensing sub-circuit when not used to transmit the display data signal, and the photoelectric sensing sub-circuit and the light emission control sub-circuit share the first voltage terminal. Thus, disposal of an additional signal line for transmitting the sensing data signal and an additional power supply for supplying power to the photoelectric sensing sub-circuit is not needed, thus reducing difficulty of circuit board layout.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
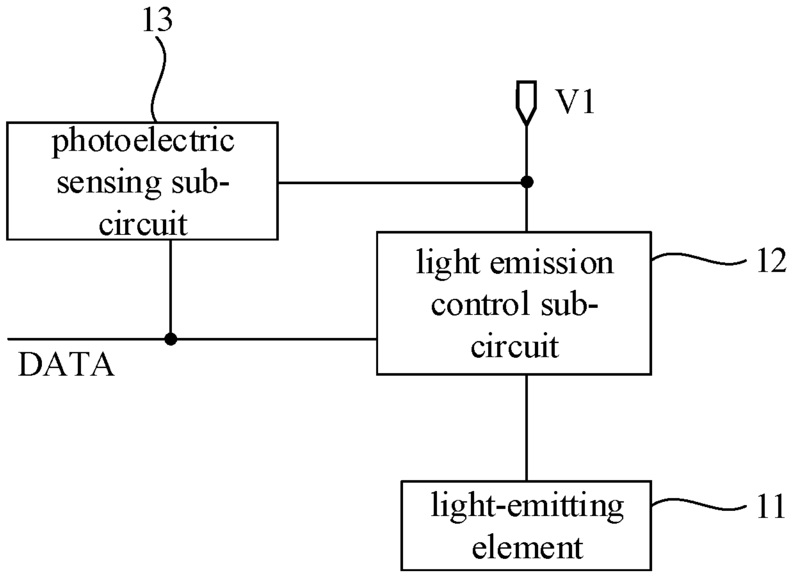
FIG. 1 is a structural schematic diagram illustrating a pixel circuit according to an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

One or more embodiments of the present disclosure provide a pixel circuit. The pixel circuit as shown in FIG. 1 includes a light-emitting element 11, a first voltage terminal V1, a data signal line DATA, a light emission control sub-circuit 12 and a photoelectric sensing sub-circuit 13.

As shown in FIG. 1, the light emission control sub-circuit 12 is connected with the first voltage terminal V1, the data signal line DATA and the light-emitting element 11. The photoelectric sensing sub-circuit 13 is connected with the first voltage terminal V1 and the data signal line DATA.

In the present embodiment, in a first time period, the data signal line DATA is used to transmit a display data signal for controlling the light emission control sub-circuit 12 to provide a drive current for the light-emitting element 11. In a second time period, the data signal line DATA is used to transmit a sensing data signal obtained by the photoelectric sensing sub-circuit 13. There is no overlap between the first time period and the second time period.

In this embodiment, the photoelectric sensing sub-circuit 13 for sensing external inputs is integrated in the pixel circuit, the data signal line DATA is used to transmit the sensing data signal obtained by the photoelectric sensing sub-circuit 13 when not used to transmit the display data signal, and the photoelectric sensing sub-circuit 13 and the light emission control sub-circuit 12 share the first voltage terminal V1. Thus, disposal of an additional signal line for transmitting the sensing data signal and an additional power supply for supplying power to the photoelectric sensing sub-circuit 13 is not needed, thus reducing the difficulty of circuit board layout.

Brief descriptions are made to the pixel circuit of the embodiments of the present disclosure as above, and detailed descriptions will be made below to the pixel circuit of the embodiments of the present disclosure.

One or more embodiments of the present disclosure provide a pixel circuit. The pixel circuit as shown in FIG. 1 includes a light-emitting element 11, a first voltage terminal V1, a data signal line DATA, a light emission control sub-circuit 12 and a photoelectric sensing sub-circuit 13.

As shown in FIG. 1, the light emission control sub-circuit 12 is connected with the first voltage terminal V1, the data signal line DATA and the light-emitting element 11. The photoelectric sensing sub-circuit 13 is connected with the first voltage terminal V1 and the data signal line DATA.

In this embodiment, the first voltage terminal V1 may provide a power supply signal of constant voltage, or may provide a power supply signal of constant voltage in a second time period and not provide a power supply signal of constant voltage in a time period other than the second time period, or may provide a power supply signal of periodic change.

In this embodiment, the photoelectric sensing sub-circuit 13 and the light emission control sub-circuit 12 share the first voltage terminal V1 and the data signal line DATA, and thus the difficulty of circuit board layout can be reduced. Furthermore, in the first time period, the data signal line DATA is used to transmit a display data signal and the light emission control sub-circuit 12 provides a drive current for the light-emitting element 11 based on the display data signal, so as to control a luminance of the light-emitting element 11. In the second time period, the data signal line DATA is used to transmit a sensing data signal obtained by photoelectric sensing sub-circuit 13 for the purpose of obtaining sensing data. Since there is no overlap between the first time period and the second time period, transmission of the display data signal will not be affected by transmission of the sensing data signal obtained by the photoelectric sensing sub-circuit 13 through the data signal line DATA, that is, sensing function can be fulfilled without affecting display function.

Figure 2:
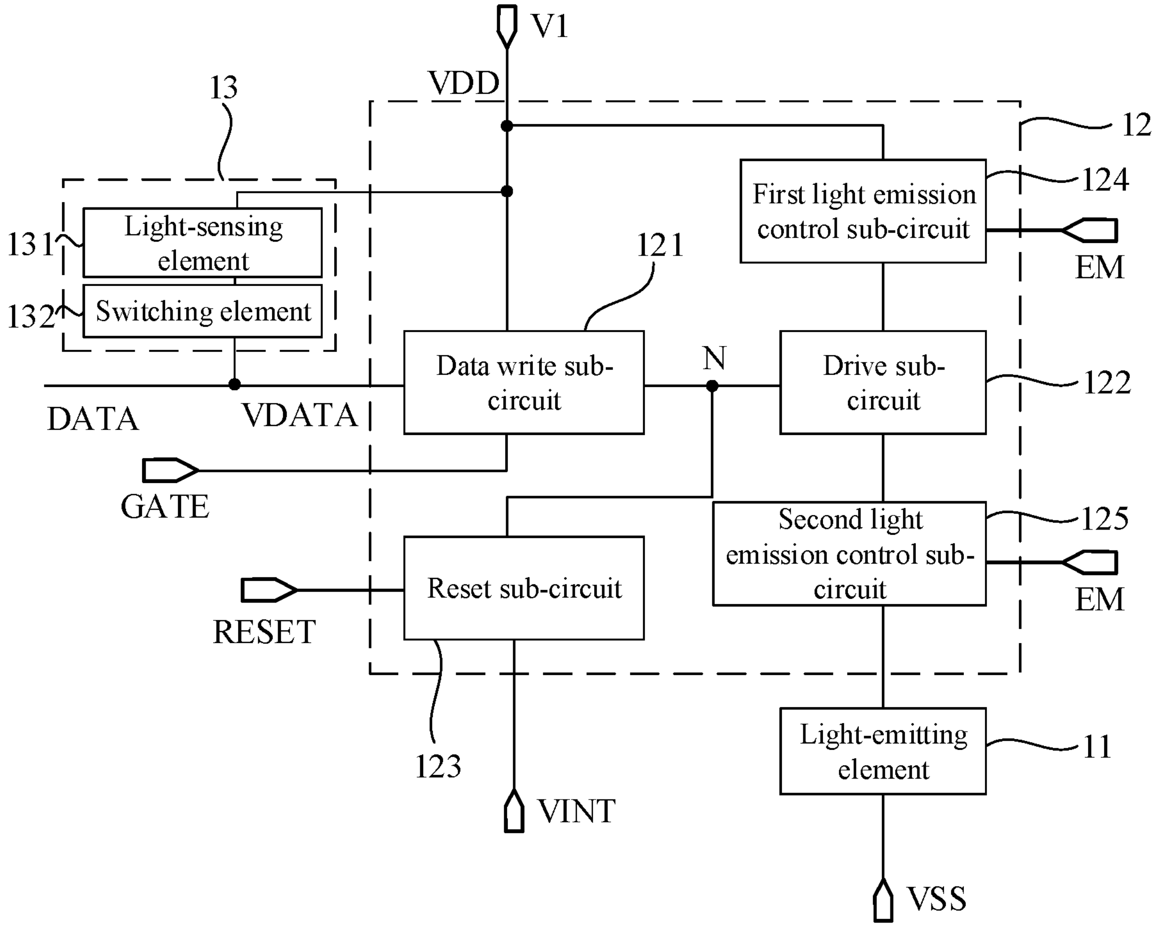
FIG. 2 is a structural schematic diagram illustrating another pixel circuit according to an embodiment of the present disclosure.

In this embodiment, as shown in FIG. 2, the light-emitting element 11 may be a diode D. The diode Dh may be an organic light-emitting diode, a miniLED or a microLED, which is not limited hereto.

In this embodiment, as shown in FIG. 2, the photoelectric sensing sub-circuit 13 includes a light-sensing element 131 and a switching element 132, and the light-sensing element 131 and the switching element 132 are connected in series between the first voltage terminal V1 and the data signal line DATA. In the first time period, the switching element 132 is in an open/off state. In this case, the light-sensing element 131 can be prevented from affecting the light emission control sub-circuit 12, and thus avoiding affecting the display function. In the second time period, the switching element 132 is in a closed/on state. In this case, the sensing data signal obtained by the light-sensing element 131 can be transmitted by the data signal line DATA.

In this embodiment, as shown in FIG. 2, the light emission control sub-circuit 12 includes a data write sub-circuit 121, a drive sub-circuit 122, a reset sub-circuit 123, a first light emission control sub-circuit 124 and a second light emission control sub-circuit 125.

As shown in FIG. 2, the data write sub-circuit 121 includes a data signal input terminal VDATA, a first power supply signal input terminal VDD and a data write control terminal GATE. The data signal input terminal VDATA is connected with the data signal line DATA to receive the display data signal, the first power supply signal input terminal VDD is used to receive a first power supply signal, and the data write control terminal GATE is used to receive a data write control signal which is configured to control the data write sub-circuit 121 to receive the display data signal and store the display data in the first time period. The data write sub-circuit 121 is connected with a connection node N which is connected with the drive sub-circuit 122. The first power supply signal input terminal VDD is connected with the first voltage terminal V1.

As shown in FIG. 2, the drive sub-circuit 122 is connected with the first power supply signal input terminal VDD through the first light emission control sub-circuit 124, and further connected with a positive pole of the light-emitting element 11 through the second light emission control sub-circuit 125 and used to provide a drive current for the light-emitting element 11.

As shown in FIG. 2, a negative pole of the light-emitting element 11 is connected with a second power supply signal input terminal VSS which is configured to receive a second power supply signal, where the second power supply signal has a lower level than the first power supply signal.

As shown in FIG. 2, the reset sub-circuit 123 includes a reset control terminal RESET and a third power supply signal input terminal VINT. The reset control terminal RESET is configured to receive a reset signal and the third power supply signal input terminal VINT is configured to receive a third power supply signal. The third power supply signal has a lower level than the first power supply signal. The reset sub-circuit 123 is connected with the connection node N.

As shown in FIG. 2, a first terminal of the first light emission control sub-circuit 124 is connected with the first power supply signal input terminal VDD, a second terminal is connected with the drive sub-circuit 122, and a control terminal is configured to receive a light emission control signal.

As shown in FIG. 2, a first terminal of the second light emission control sub-circuit 125 is connected with the drive sub-circuit 122, a second terminal is connected with the positive pole of the light-emitting element 11, and a control terminal is configured to receive a light emission control signal.

Figure 3:
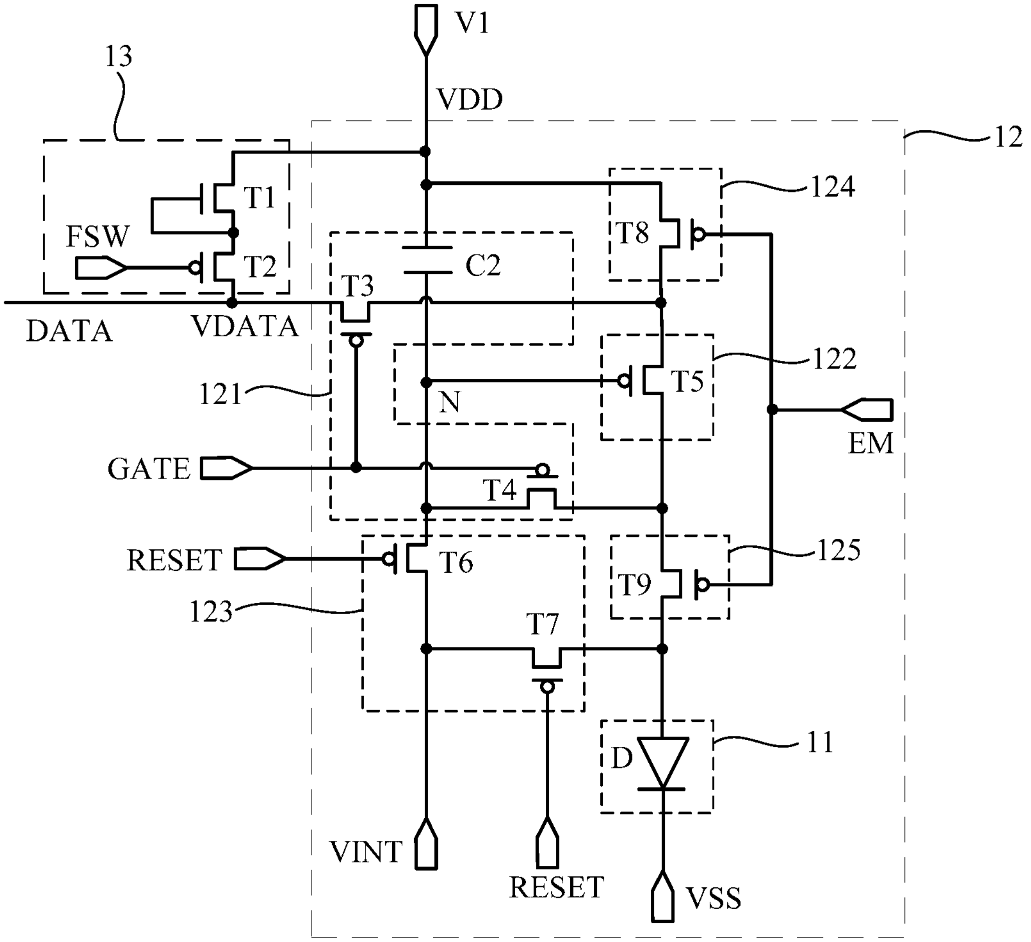
FIG. 3 is a structural schematic diagram illustrating another pixel circuit according to an embodiment of the present disclosure.

In this embodiment, as shown in FIG. 3, in the photoelectric sensing sub-circuit 13, the light-sensing element 131 is a first transistor T1, and the switching element 132 is a second transistor T2. A first electrode of the first transistor T1 is connected with the first voltage terminal V1, a second electrode of the first transistor T1 is connected with a first electrode of the second transistor T2, a gate electrode of the first transistor T1 is connected with the second electrode of the first transistor T1; a second electrode of the second transistor T2 is connected with the data signal line DATA, a gate electrode of the second transistor T2 is connected with a switching control terminal FSW for receiving a switching control signal. The switching control signal is used to control the second transistor T2 to be in an open state in the first time period and to be in a closed state in the second time period.

In this embodiment, the first transistor T1 is in an open state. When the first transistor T1 is in an open state, a dark current can be generated and in a case of illumination, a photo-generated current can be generated, where the photo-generated current is the above sensing data signal.

In this embodiment, the first transistor T1 may be a thin film transistor, for example, an a-Si transistor or an indium gallium zinc oxide (IGZO) transistor.

In this embodiment, as shown in FIG. 3, the data write sub-circuit 121 includes a third transistor T3, a fourth transistor T4 and a second capacitor C2. A first electrode of the third transistor T3 is the data signal input terminal VDATA connected with the data signal line DATA, a second electrode of the third transistor T3 is connected with a first terminal of the drive sub-circuit 122 which is connected with the first power supply signal input terminal VDD through the first light emission control sub-circuit 124, and a gate electrode of the third transistor T3 is connected with the data write control terminal GATE. A first electrode of the fourth transistor T4 is connected with the connection node N, a second electrode of the fourth transistor T4 is connected with a second terminal of the drive sub-circuit 122 which is connected with the positive pole of the light-emitting element 11 through the second light emission control sub-circuit 125, and a gate electrode of the fourth transistor T4 is connected with the data write control terminal GATE. A first electrode of the second capacitor C2 is connected with the connection node N and a second electrode of the second capacitor C2 is connected with the first power supply signal input terminal VDD.

In this embodiment, as shown in FIG. 3, the drive sub-circuit 122 includes a fifth transistor T5. A first electrode of the fifth transistor T5 is the first terminal of the drive sub-circuit 122 and connected with the first light emission control sub-circuit 124, a second electrode of the fifth transistor is the second terminal of the drive sub-circuit 122 and connected with the second light emission control sub-circuit 125, and a gate electrode of the fifth transistor T5 is connected with the connection node N.

In this embodiment, as shown in FIG. 3, the reset sub-circuit 123 includes a sixth transistor T6 and a seventh transistor T7. A first electrode of the sixth transistor T6 is connected with the connection node N, a second electrode of the sixth transistor T6 is connected with the third power supply signal input terminal VINT, and a gate electrode of the sixth transistor T6 is connected with the reset control terminal RESET. A first electrode of the seventh transistor T7 is connected with the third power supply signal input terminal VINT, a second electrode of the seventh transistor T7 is connected with the positive pole of the light-emitting element 11, and a gate electrode of the seventh transistor T7 is connected with the reset control terminal RESET.

In this embodiment, as shown in FIG. 3, the first light emission control sub-circuit 124 includes an eighth transistor T8. A first electrode of the eighth transistor T8 is connected with the first power supply signal input terminal VDD, a second electrode of the eighth transistor T8 is connected with the first terminal of the drive sub-circuit 122, and a gate electrode of the eighth transistor T8 is connected with a control terminal of the first light emission control sub-circuit 124.

In this embodiment, as shown in FIG. 3, the second light emission control sub-circuit 125 includes a ninth transistor T9. A first electrode of the ninth transistor T9 is connected with the second terminal of the drive sub-circuit 122, a second electrode of the ninth transistor T9 is connected with the positive pole of the light-emitting element 11, and a gate electrode of the ninth transistor T9 is connected with a control terminal of the second light emission control sub-circuit 125.

In this embodiment, the first transistor T1 is an N-type transistor, and the second transistor T2, the third transistor T3, the fourth transistor T4, the fifth transistor T5, the sixth transistor T6, the seventh transistor T7, the eighth transistor T8, and the ninth transistor T9 are all P-type transistors. The first electrode of the first transistor T1 may be a drain electrode, and the second electrode of the first transistor T1 may be a source electrode, which is not limited hereto. The first electrodes of the second to ninth transistors T2 to T9 are source electrodes, and the second electrodes are drain electrodes. When the first electrode of the first transistor T1 is a drain electrode and the second electrode of the first transistor T1 is a source electrode, a voltage between the gate electrode and the source electrode of the first transistor T1 Vgs=0. A threshold voltage Vth of the first transistor T1 may be 0.7 volts, i.e. Vgs<Vth, and the first transistor T1 is in an open state.

Of course, in other embodiments, the first transistor T1 may alternatively be a P-type transistor, and the second to ninth transistors T2 to T9 may alternatively be N-type transistors.

In this embodiment, to protect the second transistor T2 against light irradiation, a distance between the first transistor T1 and the second transistor T2 may be slightly increased, or, a light blocking structure is provided for the second transistor T2. In other embodiments, to protect the transistors other than the first transistor T1 against light irradiation, light blocking structures may be disposed for the transistors other than the first transistor T1.

In this embodiment, in the first time period, the switching control signal received by the switching control terminal FSW is of high level, the second transistor T2 is in an open state, and the data signal line DATA is used to transmit the display data signal to control the light emission control sub-circuit 12 to provide a drive current for the light-emitting element 11, thus controlling a luminance of the light-emitting element 11. In the second time period, the switching control signal received by the switching control terminal FSW is of low level, the second transistor T2 is in a closed state, and the data signal line DATA is used to transmit the sensing data signal obtained by the first transistor T1. Since there is no overlap between the first time period and the second time period, transmission of the display data signal will not be affected by transmission of the sensing data signal obtained by the photoelectric sensing sub-circuit 13 through the data signal line DATA, that is, sensing function can be fulfilled without affecting display function.

In this embodiment, the photoelectric sensing sub-circuit 13 for sensing external inputs is integrated in the pixel circuit, the data signal line DATA may be used respectively to transmit the display data signal and the sensing data signal in different time periods, and the photoelectric sensing sub-circuit 13 and the light emission control sub-circuit 12 share the first voltage terminal V1. Thus, disposal of an additional signal line for transmitting the sensing data signal and an additional power supply for supplying power to the photoelectric sensing sub-circuit 13 is not needed, thus reducing the difficulty of circuit board layout.

Furthermore, the photoelectric sensing sub-circuit 13 is integrated in the pixel circuit rather than disposed in a bezel region or under a display panel, and therefore, it helps to reduce the area of the bezel region or the thickness of the display panel, which is favorable for implementation of narrow bezel or thin display panel.

Figure 4:
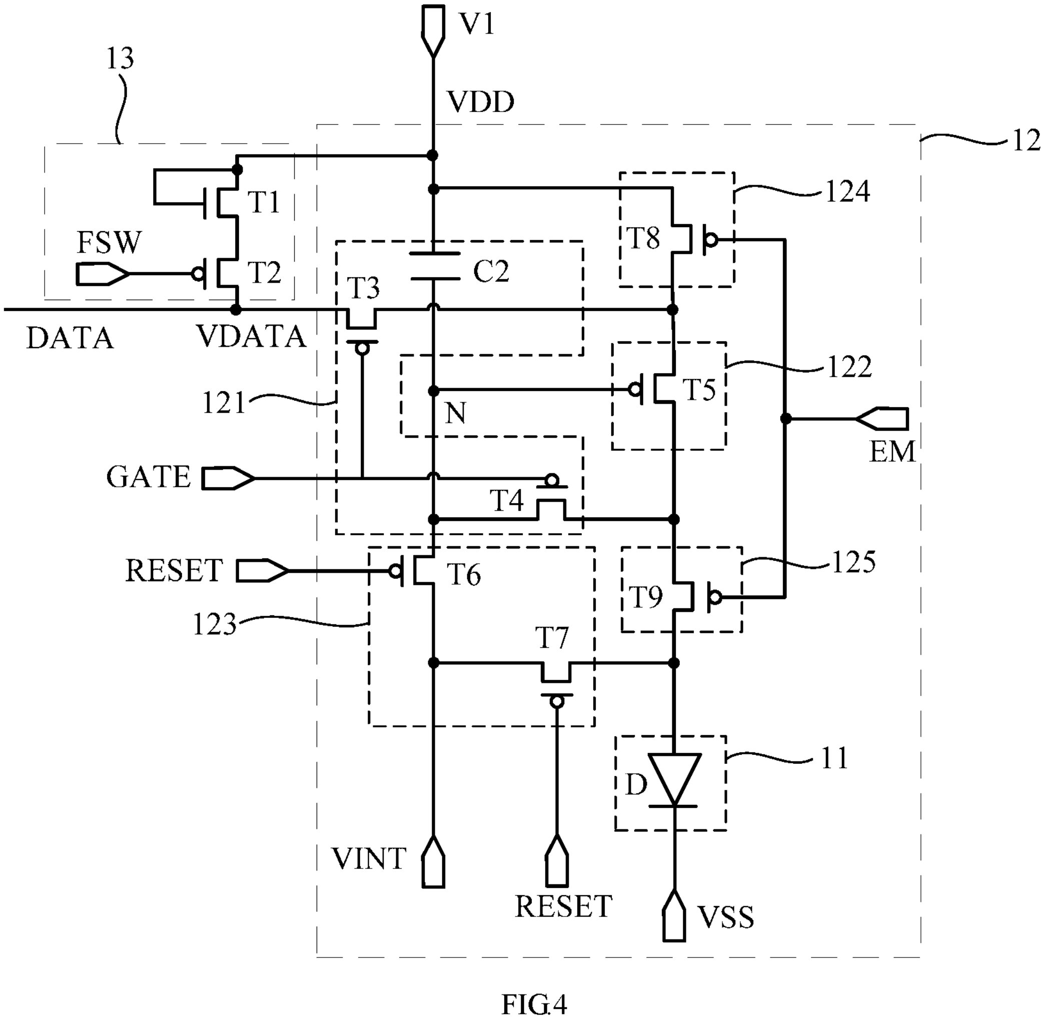
FIG. 4 is a structural schematic diagram illustrating another pixel circuit according to an embodiment of the present disclosure.

An embodiment of the present disclosure further provides a pixel circuit. As shown in FIG. 4, in this embodiment, the pixel circuit differs from the pixel circuit shown in FIG. 3 in that: the gate electrode of the first transistor T1 is connected with the first electrode of the first transistor T1. In this embodiment, the first electrode of the first transistor T1 may be a source electrode, and the second electrode of the first transistor T1 may be a drain electrode, and thus, the first transistor T1 can be put in an open state.

Figure 5:
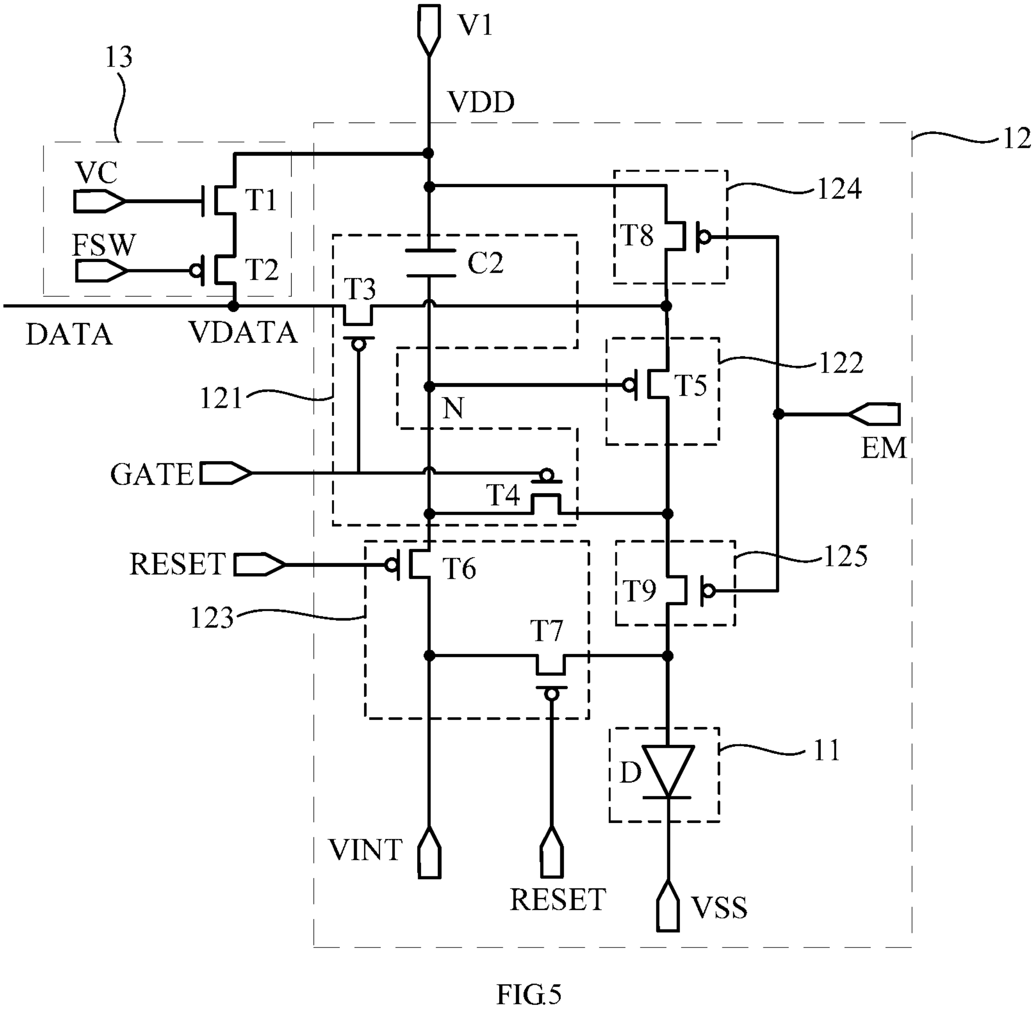
FIG. 5 is a structural schematic diagram illustrating another pixel circuit according to an embodiment of the present disclosure.

An embodiment of the present disclosure further provides a pixel circuit. As shown in FIG. 5, in this embodiment, the pixel circuit differs from the pixel circuit shown in FIG. 3 in that: the gate electrode of the first transistor T1 is connected with a switch-off signal input terminal VC for receiving a switch-off signal which is used to control the first transistor T1 to be in an open state.

Figure 6:
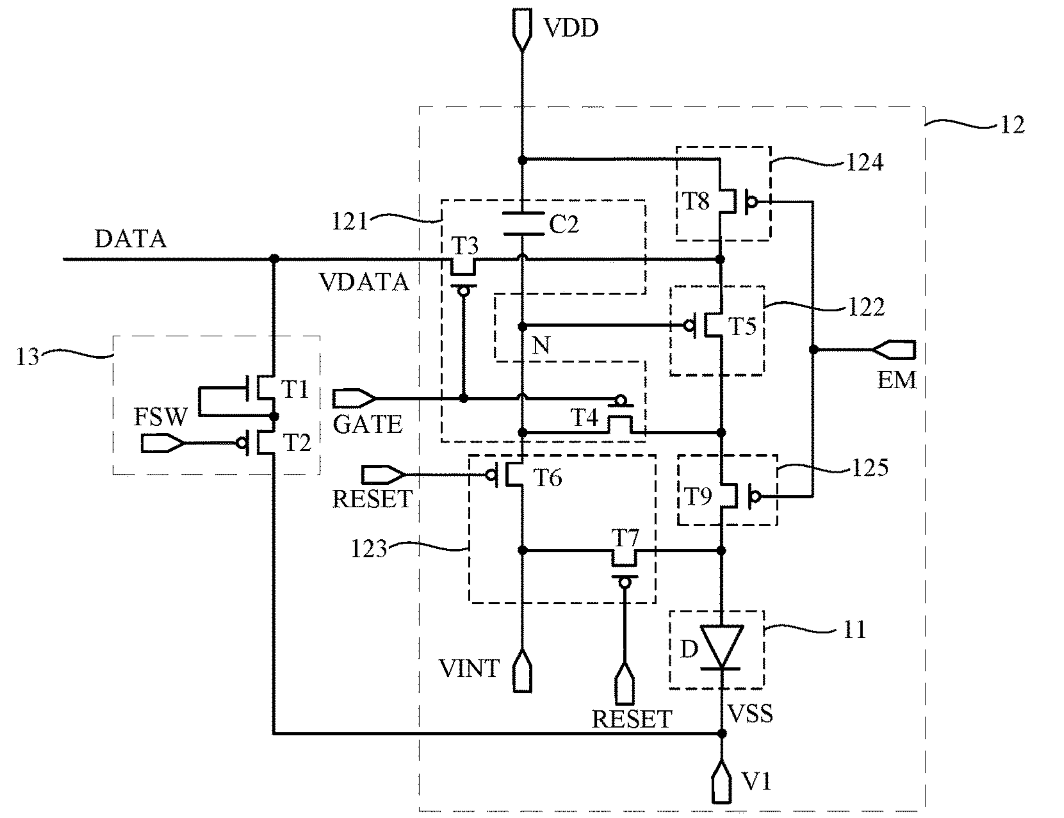
FIG. 6 is a structural schematic diagram illustrating another pixel circuit according to an embodiment of the present disclosure.

An embodiment of the present disclosure further provides a pixel circuit. As shown in FIG. 6, in this embodiment, the pixel circuit differs from the pixel circuit shown in FIG. 3 in that: the first voltage terminal V1 is used to provide the second power supply signal and the second power supply signal input terminal VSS is connected with the first voltage terminal V1.

In this embodiment, the first electrode of the first transistor T1 is connected with the data signal line DATA, the second electrode is connected with the first voltage terminal V1 through the switching element 132, and the gate electrode of the first transistor T1 is connected with the second electrode of the first transistor T1. In this embodiment, the first electrode of the first transistor T1 may be a drain electrode, and the second electrode of the first transistor T1 may be a source electrode and thus the first transistor T1 can be put in an open state.

In another embodiment, the gate electrode of the first transistor T1 may be connected with the first electrode of the first transistor T1. The first electrode of the first transistor T1 may be a source electrode and the second electrode of the first transistor T1 may be a drain electrode, and thus the first transistor T1 can be put in an open state.

In another embodiment, the gate electrode of the first transistor T1 is used to input a switch-off signal for controlling the first transistor T1 to be in an open state.

Figure 7:
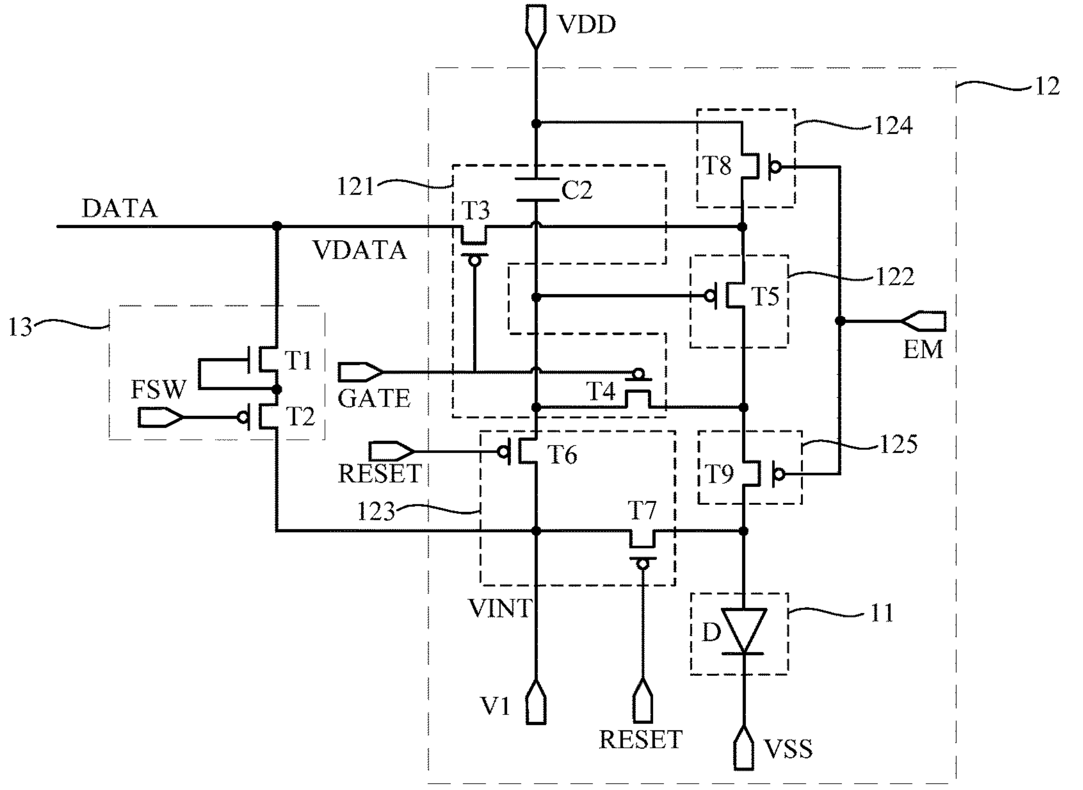
FIG. 7 is a structural schematic diagram illustrating another pixel circuit according to an embodiment of the present disclosure.

An embodiment of the present disclosure further provides a pixel circuit. As shown in FIG. 7, in this embodiment, the pixel circuit differs from the pixel circuit shown in FIG. 3 in that: the first voltage terminal V1 is used to provide the third power supply signal and the third power supply signal input terminal VINT is connected with the first voltage terminal V1.

In this embodiment, the first electrode of the first transistor T1 is connected with the data signal line DATA, the second electrode of the first transistor T1 is connected with the first voltage terminal V1 through the switching element 132, and the gate electrode of the first transistor T1 is connected with the second electrode. In this embodiment, the first electrode of the first transistor T1 may be a drain electrode and the second electrode of the first transistor T1 may be a source electrode, and thus the first transistor T1 can be put in an open state.

In another embodiment, the gate electrode of the first transistor T1 is connected with the first electrode. The first electrode of the first transistor T1 may be a source electrode and the second electrode of the first transistor T1 may be a drain electrode and thus the first transistor T1 can be put in an open state.

In another embodiment, the gate electrode of the first transistor T1 is used to input a switch-off signal for controlling the first transistor T1 to be in an open state.

Figure 8:
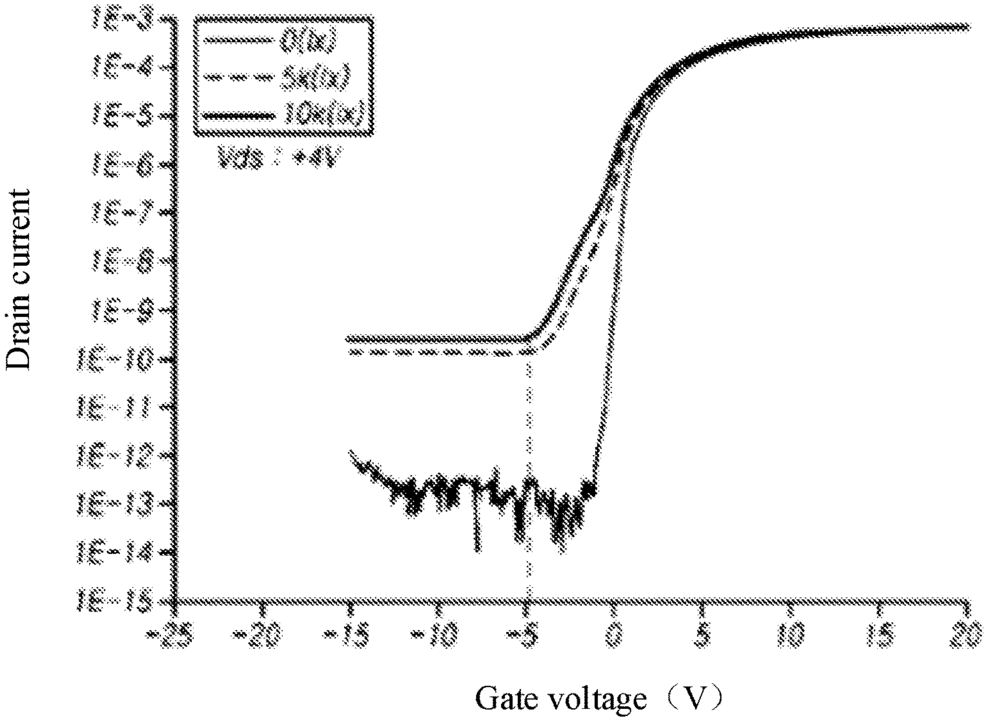
FIG. 8 is a schematic diagram illustrating test results when a first transistor is an N-type transistor according to an embodiment of the present disclosure.

It is to be noted that, when the first transistor T1 is an N-type transistor, the test results are shown as in FIG. 8. When a voltage less than 0V is applied to the gate electrode of the first transistor T1 and a voltage difference Vds between the source electrode and the drain electrode of the first transistor T1 is 4V, it can be seen that when the first transistor T1 is exposed to light, a drain electrode current of the first transistor T1 is increased.

When the first transistor T1 is disposed as a bottom gate structure and irradiated by light, the intensity of the drain electrode current generated in a cutoff state of the first transistor T1 can be increased. By increasing the cutoff current generated by the optical response of the first transistor T1, optical sensing can be performed using the first transistor T1 disposed in the pixels.

Figure 9:
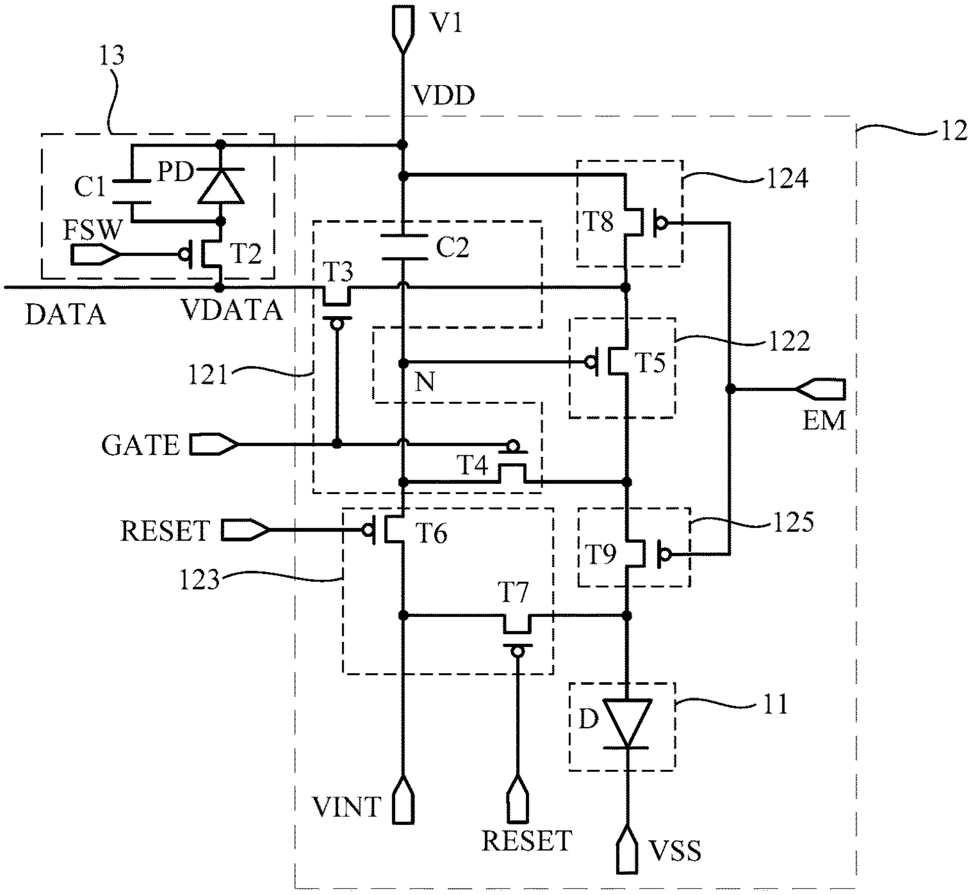
FIG. 9 is a structural schematic diagram illustrating another pixel circuit according to an embodiment of the present disclosure.

An embodiment of the present disclosure further provides a pixel circuit. As shown in FIG. 9, in this embodiment, the pixel circuit differs from the above pixel circuits in that: the light-sensing element 131 is a photodiode PD. A cathode of the photodiode PD is connected with the first voltage terminal V1, and an anode of the photodiode PD is connected with the data signal line DATA through the switching element 132. In the second time period, the voltage of the cathode of the photodiode PD is greater than the voltage of the anode, and the photodiode PD is in an open state or in a cutoff state.

Of course, in other embodiments, the anode of the photodiode PD may be connected with the first voltage terminal V1, and the cathode of the photodiode PD may be connected with the data signal line DATA through the switching element 132. The voltage of the cathode of the photodiode PD is greater than the voltage of the anode, and the photodiode PD is in an open state.

In this embodiment, the photodiode PD may be a PN diode, a PIN diode, or an organic photodiode (OPD).

In another embodiment, as shown in FIG. 9, the photoelectric sensing sub-circuit 13 may further include a first capacitor C1 which is connected in parallel at both ends of the photodiode PD. In another embodiment, the first capacitor C1 may be connected in parallel at opposite ends of the photodiode PD and the second transistor T2.

Figure 10:
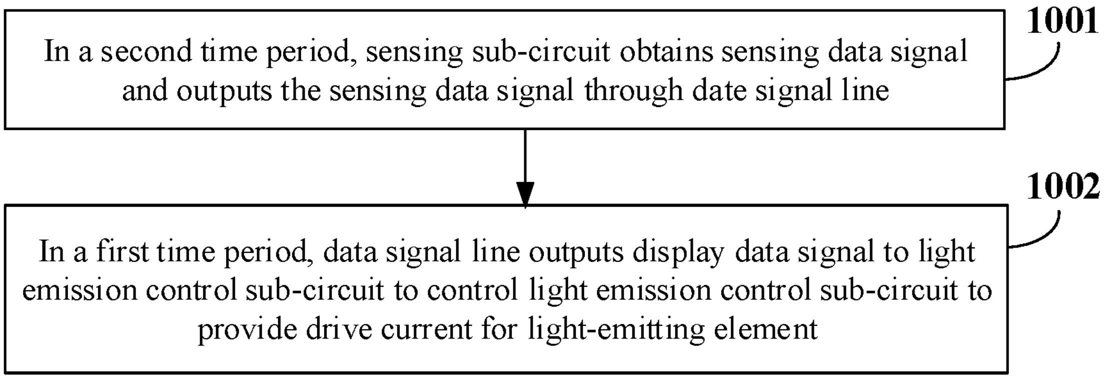
FIG. 10 is a flowchart illustrating a method of driving a pixel circuit according to an embodiment of the present disclosure.

One or more embodiments of the present disclosure further provide a method of driving a pixel circuit. The method of driving a pixel circuit is applied to drive the above pixel circuits according to any one of the above embodiments. As shown in FIG. 10, the method may include the following steps 1001 to 1002.

At step 1001, in a second time period, the photoelectric sensing sub-circuit 13 obtains a sensing data signal and outputs the sensing data signal through the data signal line DATA.

At step 1002, in a first time period, the data signal line DATA outputs a display data signal to the light emission control sub-circuit 12 to control the light emission control sub-circuit 12 to provide a drive current for the light-emitting element 11.

In this embodiment, with the pixel circuit shown in FIG. 3 and the timing diagram of signal shown in FIG. 11 as an example, the method of driving a pixel circuit is described below.

Figure 11:
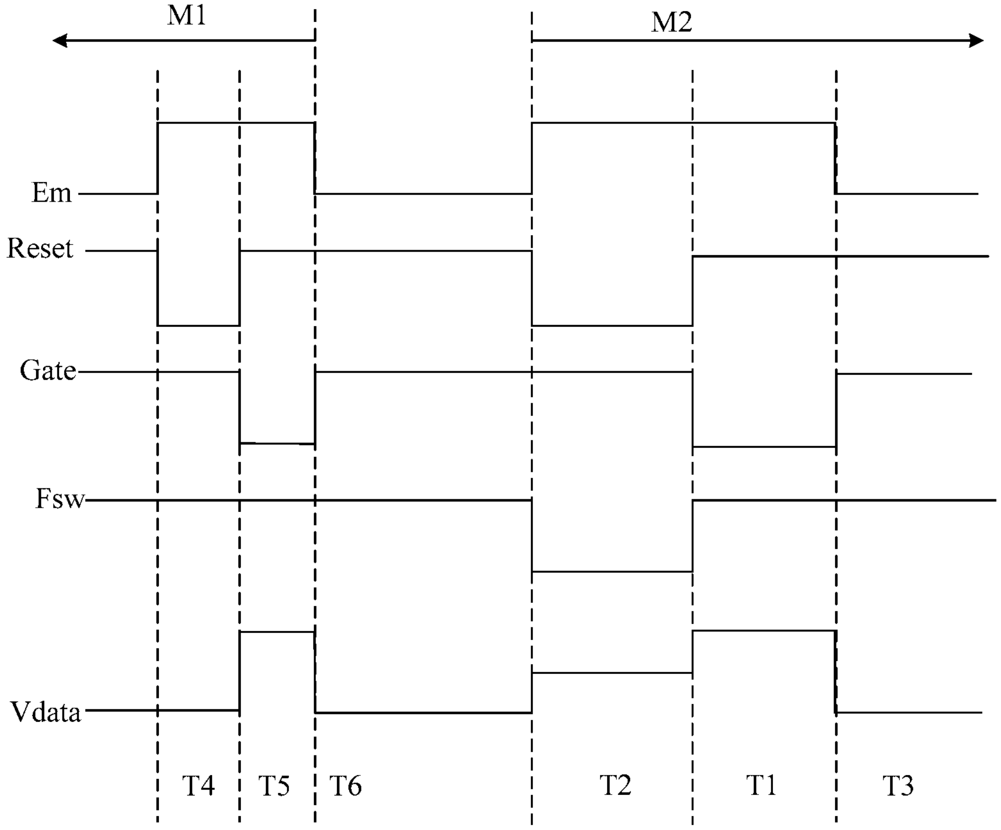
FIG. 11 is a signal timing diagram of a method of driving a pixel circuit according to an embodiment of the present disclosure.

As shown in FIG. 11, the pixel circuit may work under a high frequency refresh mode M1 and a low frequency refresh mode M2. When the pixel circuit works under the high frequency refresh mode M1, the photoelectric sensing sub-circuit 13 does not perform the sensing function, and when the pixel circuit works under the low frequency refresh mode M2, the photoelectric sensing sub-circuit 13 performs the sensing function. When the pixel circuit works under the high frequency refresh mode M1, a refresh frequency of a display apparatus to which the pixel circuit belongs may be 240 Hz, 120 Hz, 90 Hz or 60 Hz, which is not limited hereto. When the pixel circuit works under the low frequency refresh mode M2, the refresh frequency of the display apparatus to which the pixel circuit belongs may be 60 Hz, 30 Hz or 15 Hz, which is not limited hereto.

As shown in FIG. 11, when the pixel circuit works under the high frequency refresh mode M1, within a first reset time period T4, the reset signal Reset is of low level, the sixth transistor T6 and the seventh transistor T7 are in a closed state, and the third power supply signal is input into the anode of the diode D and the second capacitor C2 to enable the diode D and the second capacitor C2 to be reset. The level of the third power supply signal may be a preset level value used to enable the diode D and the second capacitor C2 to be reset. Within the first reset time period T4, the switching control signal Fsw is of high level, the second transistor T2 is in an open state, and the photoelectric sensing sub-circuit 13 does not perform the sensing function.

As shown in FIG. 11, within a data write time period T5, the data write control signal Gate is of low level, the third transistor T3 and the fourth transistor T4 are in a closed state, and the data signal line DATA is used to transmit the display data signal Vdata which is written into the second capacitor C2.

As shown in FIG. 11, within a first light emission time period T6, the light emission control signal Em is of low level, the eighth transistor T8 and the ninth transistor T9 are in a closed state, and the fifth transistor T5 provides a drive current for the diode D to drive the diode D to emit light.

As shown in FIG. 11, when the pixel circuit works under the low frequency refresh mode M2, within the second time period T2, the reset signal Reset is of low level, the sixth transistor T6 and the seventh transistor T7 are in a closed state, and the third power supply signal is input into the anode of the diode D and the second capacitor C2 to enable the diode D and the second capacitor C2 to be reset. Further, the switching control signal Fsw is of low level and can control the second transistor T2 to be in a closed state, and the photoelectric sensing sub-circuit 13 performs the sensing function. The sensing data signal obtained by the first transistor T1 is transmitted through the data signal line DATA. In a case of no illumination, the first transistor T1 can generate a dark current, and if the photoelectric sensing sub-circuit 13 performs the sensing function, the dark current is the above sensing data signal. In a case of illumination, the first transistor T1 can further generate a photo-generated current. Due to presence of the dark current, the sensing data signal includes the above dark current and the above photo-generated current, where the dark current is far smaller than the photo-generated current.

As shown in FIG. 11, within the first time period T1, the data write control signal Gate is of low level, the third transistor T3 and the fourth transistor T4 are in a closed state, and the data signal line DATA is used to transmit the display data signal Vdata. The display data signal is written into the second capacitor C2.

As shown in FIG. 11, within a second light emission time period T3, the light emission control signal Em is of low level, the eighth transistor T8 and the ninth transistor T9 are in a closed state, and the fifth transistor T5 provides a drive current for the diode D to drive the diode D to emit light.

In this embodiment, the second time period T2 is greater than the first reset time period T4. In this way, it can be guaranteed that there is sufficient time to obtain the sensing data. The first time period T1 is greater than the data write time period T5, and the second light emission time period T3 is greater than the first light emission time period T6.

Figure 12:
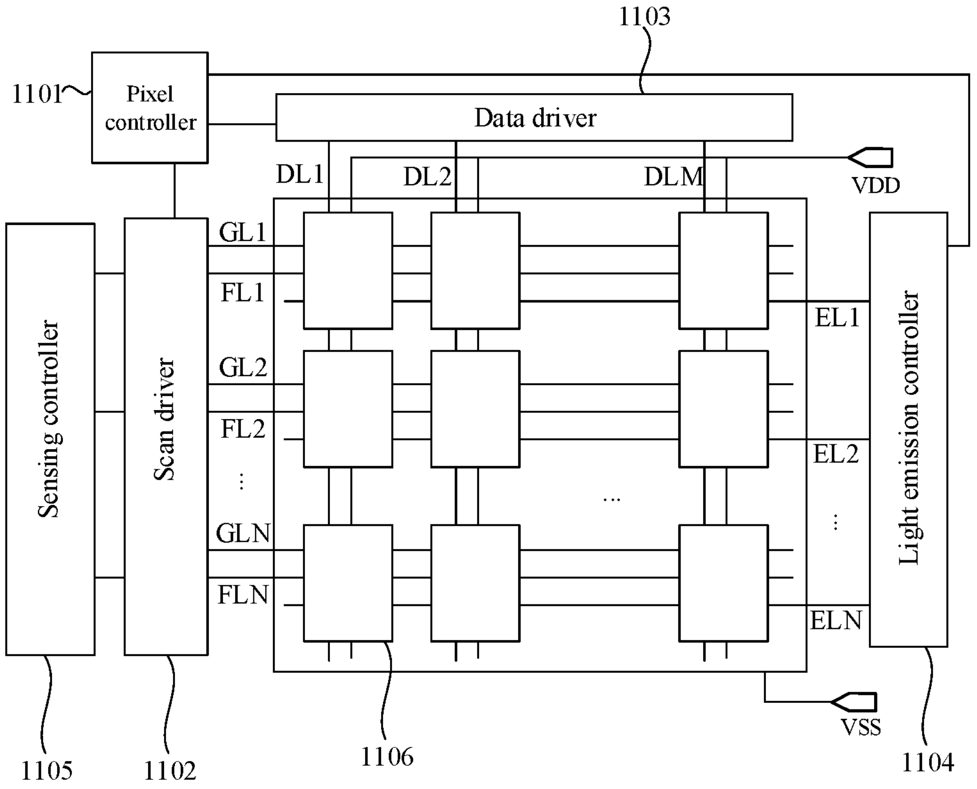
FIG. 12 is a structural schematic diagram illustrating a display panel according to an embodiment of the present disclosure.

One or more embodiments of the present disclosure further provide a display panel. As shown in FIG. 12, the display panel includes a pixel controller 1101, a scan driver 1102, a data driver 1103, a light emission controller 1104, a sensing controller 1105, a plurality of light emission control signal lines, a plurality of switching control signal lines and a plurality of pixels 1106. The pixels 1106 include the above pixel circuits. Each pixel circuit includes one scan signal line and one data signal line DATA. A plurality of pixel circuits include a plurality of scan signal lines and a plurality of data signal lines DATA.

As shown in FIG. 12, the plurality of scan signal lines include a first scan signal line GL1, a second scan signal line GL2, . . . and an N-th scan signal line GLN; the plurality of data signal lines DATA include a first data signal line DL1, a second data signal line DL2, and an M-th data signal line DLM; the plurality of light emission control signal lines include a first light emission control signal line EL1, a second light emission control signal line EL2, . . . and an N-th light emission control signal line ELN; the plurality of switching control signal lines include a first switching control signal line FL1, a second switching control signal line FL2, . . . and an N-th switching control signal line FLN, where N is a positive integer and M is a positive integer.

As shown in FIG. 12, the pixel controller 1101 is connected with the scan driver 1102, the data driver 1103 and the light emission controller 1104 respectively. The pixel controller 1101 is used to convert image signals provided by an application processor into a plurality of display data signals and transmit the plurality of display data signals to the data driver 1103. The pixel controller 1101 is also used to provide a scan control signal for controlling the scan driver 1102 and a data drive control signal for controlling the data driver 1103.

As shown in FIG. 12, the scan driver 1102 is connected with each row of pixel circuits through the first scan signal line GL1, the second scan signal line GL2, . . . and the N-th scan signal line GLN respectively to output scan signals to each row of pixel circuits respectively based on a preset sequence.

As shown in FIG. 12, the data driver 1103 is connected with each column of pixel circuits through the first data signal line DL1, the second data signal line DL2, . . . and the M-th data signal line DLM respectively to output a plurality of display data signals to each column of pixel circuits respectively.

As shown in FIG. 12, the light emission controller 1104 is connected with each row of pixel circuits through the first light emission control signal line EL1, the second light emission control signal line EL2, . . . and the N-th light emission control signal line ELN respectively to output light emission control signals to each row of pixel circuits respectively.

As shown in FIG. 12, the sensing controller 1105 is connected with each row of pixel circuits through the first switching control signal line FL1, the second switching control signal line FL2, . . . and the N-th switching control signal line FLN respectively to output switching control signals to each row of pixel circuits respectively.

It is to be noted that FIG. 12 shows an embodiment where a photoelectric sensing sub-circuit 13 is disposed in each pixel circuit in a display panel. In other embodiments, some pixel circuits of the display panel are provided with the photoelectric sensing sub-circuits 13. Further, in the embodiment shown in FIG. 12, the sensing controller 1105 and the scan driver 1102 are two independent devices. In other embodiments, only the scan driver 1102 may be disposed without separately disposing the sensing controller 1105, and the scan driver 1102 can provide scan signals and switching control signals.

One or more embodiments of the present disclosure further provide a display apparatus. The display apparatus includes a display module and the display panel described in any one of the above embodiments.

In the embodiments, the display apparatus has a fingerprint sensing function. The display apparatus can determine valleys and ridges of a fingerprint based on the above sensing data signals.

In the embodiments, each pixel circuit in a display region of the display apparatus is the above pixel circuit and thus the entire display region can realize fingerprint detection function. In other embodiments, each pixel circuit in a part of the display region is the above pixel circuit and hence the part of the display region can realize fingerprint detection function.

In this embodiment, when the display apparatus receives a fingerprint sensing/detection instruction, the display apparatus is controlled to enter the low frequency refresh mode M2 and the second transistors T2 are controlled to be in a closed state by the switching control signal Fsw. The photoelectric sensing sub-circuits 13 execute the sensing function, and the sensing data signals obtained by the first transistors T1 are transmitted to a fingerprint processor through the data signal lines DATA. The fingerprint processor may obtain fingerprint information based on the obtained sensing data signals. The fingerprint information may be used to unlock a fingerprint lock for locking a screen or an application program.

Figure 13:
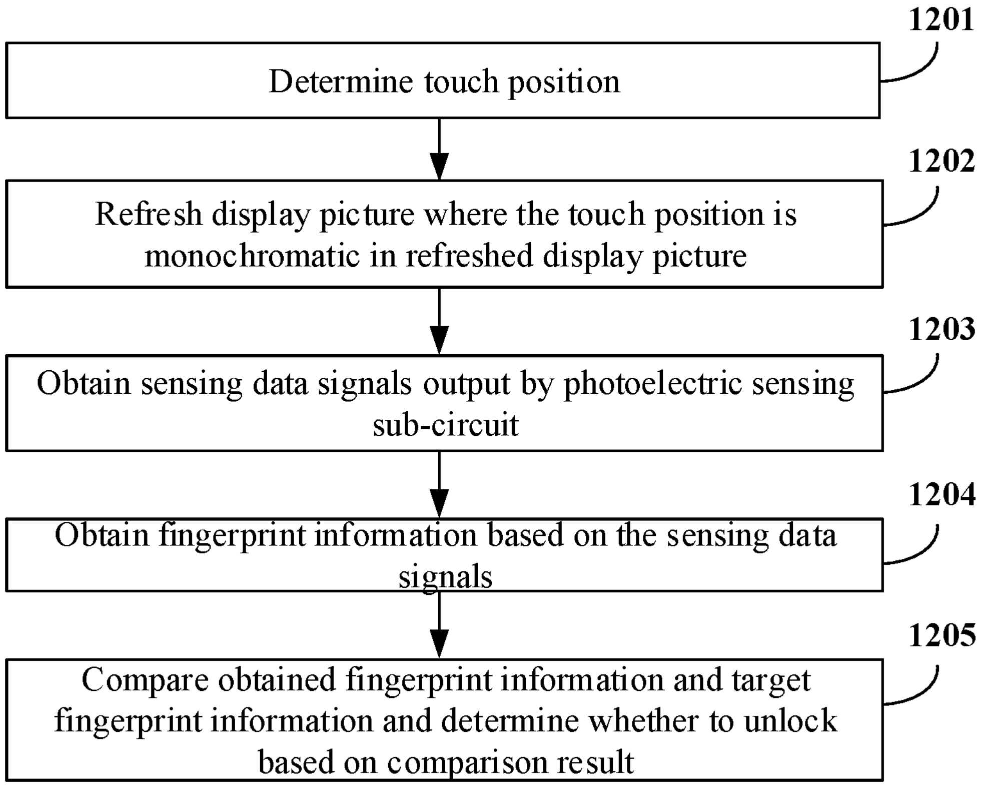
FIG. 13 is a flowchart illustrating an unlocking method according to an embodiment of the present disclosure.

An unlocking method will be described below with unlocking an application program using fingerprint information as an example. As shown in FIG. 13, the unlocking method may include the following steps 1201 to 1205.

At step 1201, a touch position is determined.

In this embodiment, the display apparatus further includes a touch panel which cooperates with the above pixel circuits to implement a function of unlocking an application program using fingerprint.

Figure 14:
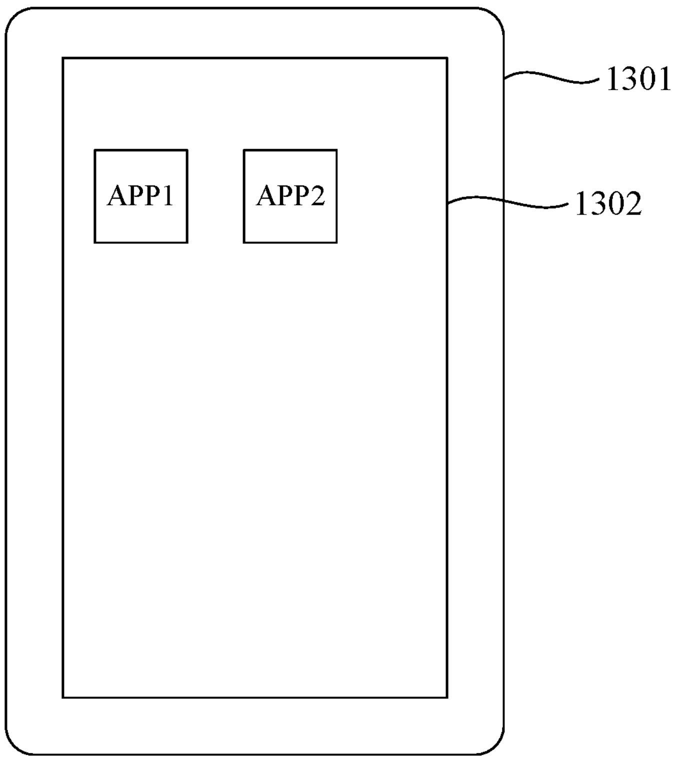
FIGS. 14 to 17 are schematic diagrams illustrating application scenarios of an unlocking method according to an embodiment of the present disclosure.
Figure 15:
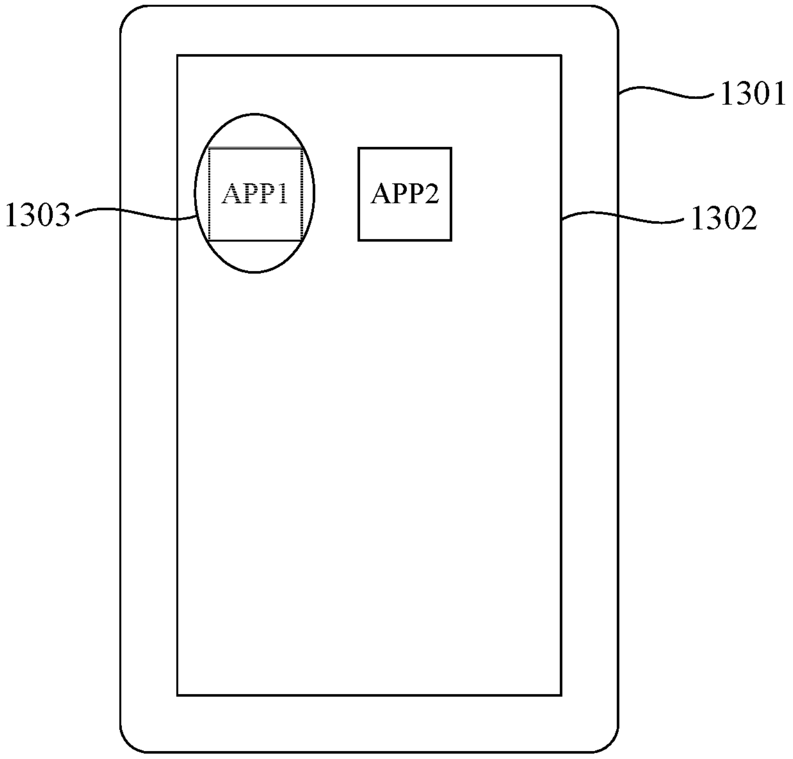

As shown in FIG. 14, a first icon APP1 of a first application program and a second icon APP2 of a second application program are displayed in a first display picture 1302 of the display apparatus 1301. When the first application program uses a fingerprint lock and is to be opened by a user, the first application program is to be firstly unlocked. As shown in FIG. 15, when unlocking the first application program, the user may place a finger 1303 at a display position of the first icon APP1 of the first application program. The display apparatus may determine the touch position based on capacitance values of touch electrodes in the touch panel, and the touch position may be basically same as the display position of the first icon APP1.

At step 1202, the display picture is refreshed, where the touch position is monochromatic in the refreshed display picture.

Figure 16:
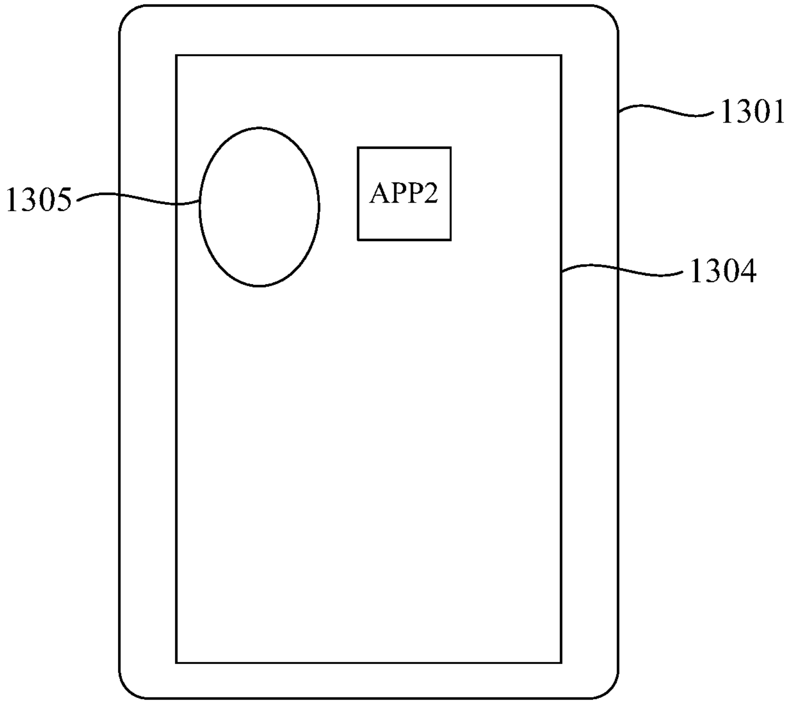

In this embodiment, the display apparatus refreshes the display picture after determining the touch position. As shown in FIG. 16, a touch position 1305 in a refreshed second display picture 1304 is monochromatic. For example, the touch position 1305 may be green, red, blue or white, which is not limited herein. Light emitted by pixels at the touch position 1305 is reflected by the finger and then sensed by first transistors T1, hereby obtaining sensing data signals.

At step 1203, the sensing data signals output by the photoelectric sensing sub-circuits 13 are obtained.

In this embodiment, the fingerprint processor in the display apparatus may obtain, through the data signal lines DATA, the sensing data signals output by the photoelectric sensing sub-circuits 13.

At step 1204, fingerprint information is obtained based on the sensing data signals.

In this embodiment, the fingerprint processor may obtain the fingerprint information based on the obtained sensing data signals.

At step 1205, the obtained fingerprint information is compared with target fingerprint information and whether to unlock is determined based on a comparison result.

Figure 17:
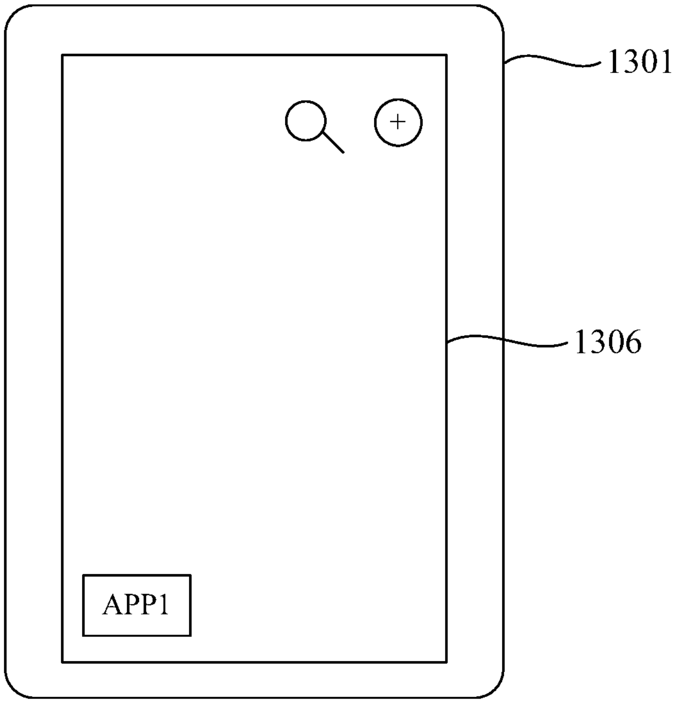

In this embodiment, the fingerprint processor may compare the obtained fingerprint information with pre-stored target fingerprint information and determine whether to unlock based on a comparison result. As shown in FIG. 17, when the obtained fingerprint information matches the target fingerprint information, the first application program is unlocked and opened to display a third display picture 1306 of the first application program. When the obtained fingerprint information does not match the target fingerprint information, unlocking fails.

It is to be noted that the display apparatus in this embodiment may be an electronic paper, a mobile phone, a tablet computer, a television, a laptop computer, a digital photo frame, a navigator or any other products or components having a display function.

It should be noted that in the accompanying drawings, for illustration clarity, the sizes of the layers and regions may be exaggerated. Furthermore, it may be understood that when an element or layer is referred to as being "on" another element or layer, such element or layer may be directly on the another element or layer or there is an intermediate layer therebetween. Further, it is understood that when an element or layer is referred to as being "under" another element or layer, such element or layer may be directly under the another element or layer, or one or more intermediate elements or layers are present therebetween. In addition, it may also be understood that when a layer or element is referred to as being between two layers or elements, such layer or element may be a sole layer between the two layers or elements, or one or more intermediate layers or elements are present. Like reference signs in the descriptions indicate like elements.

In the present disclosure, the terms "first" and "second" are used only for the purpose of descriptions and shall not be understood as indicating or implying relative importance. The term "plurality" refers to two or more, unless otherwise indicated clearly.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A pixel circuit, comprising:

a light-emitting element;

a first voltage terminal;

a data signal line;

a light emission control sub-circuit, connected with the first voltage terminal, the data signal line and the light-emitting element; and a photoelectric sensing sub-circuit, connected with the first voltage terminal and the data signal line;

wherein, in a first time period, the data signal line is configured to transmit a display data signal which is configured to control the light emission control sub-circuit to provide a drive current for the light-emitting element; and in a second time period, the data signal line is configured to transmit a sensing data signal obtained by the photoelectric sensing sub-circuit;

wherein the photoelectric sensing sub-circuit comprises a light-sensing element and a switching element, and the light-sensing element and the switching element are connected in series between the first voltage terminal and the data signal line;

in the first time period, the switching element is in an open state; and in the second time period, the switching element is in a closed state;

wherein the light-sensing element is a first transistor, which is in the open state;

wherein the light emission control sub-circuit comprises a data write sub-circuit, a drive sub-circuit, and a reset sub-circuit;

the data write sub-circuit comprises a data signal input terminal for receiving the display data signal and a first power supply signal input terminal for receiving a first power supply signal, the data write sub-circuit is connected with a connection node which is connected with the drive sub-circuit, and the data signal input terminal is connected with the data signal line;

the drive sub-circuit is connected with the first power supply signal input terminal and the light-emitting element, and configured to provide a drive current for the light-emitting element;

the light-emitting element is further connected with a second power supply signal input terminal for receiving a second power supply signal; the second power supply signal has a lower level than the first power supply signal; and the reset sub-circuit comprises a reset control terminal for receiving a reset signal and a third power supply signal input terminal for receiving a third power supply signal, the reset sub-circuit is connected with the connection node; and the third power supply signal has a lower level than the first power supply signal;

wherein the reset sub-circuit completes a reset by inputting the third power supply signal into the light-emitting element and the data write sub-circuit;

wherein the switching element of the photoelectric sensing sub-circuit is a second transistor;

wherein a first electrode of the first transistor is connected to the first voltage terminal, and a second electrode of the first transistor is connected to a gate electrode of the first transistor and a second electrode of the second transistor;

wherein a gate electrode of the second transistor is connected to a switching control terminal to receive a switching control signal; and a first electrode of the second transistor is directly connected to the data signal input terminal of the data write sub-circuit.

2. The pixel circuit of claim 1, wherein the first voltage terminal is configured to provide the first power supply signal, and the first power supply signal input terminal is connected with the first voltage terminal;

the gate electrode of the first transistor is configured to input a switch-off signal for controlling the first transistor to be in the open state.

3. The pixel circuit of claim 1, wherein the light emission control sub-circuit further comprises a first light emission control sub-circuit and a second light emission control sub-circuit;

a first terminal of the first light emission control sub-circuit is connected with the first power supply signal input terminal, a second terminal of the first light emission control sub-circuit is connected with the drive sub-circuit, and a control terminal of the first light emission control sub-circuit is configured to receive a light emission control signal; and a first terminal of the second light emission control sub-circuit is connected with the drive sub-circuit, a second terminal of the second light emission control sub-circuit is connected with the light-emitting element, and a control terminal of the second light emission control sub-circuit is configured to receive the light emission control signal.

4. A method of driving a pixel circuit, applied to drive the pixel circuit according to claim 1, comprising:

in a first time period, outputting, by a data signal line, a display data signal to a light emission control sub-circuit to control the light emission control sub-circuit to provide a drive current for a light-emitting element; and in a second time period, obtaining, by a photoelectric sensing sub-circuit, a sensing data signal and outputting the sensing data signal through the data signal line, wherein, in the second time period, obtaining, by the photoelectric sensing sub-circuit, the sensing data signal comprises:

in the second time period, controlling the switching element to be in a closed state.

5. The method of claim 4, wherein in the second time period, obtaining, by the photoelectric sensing sub-circuit, the sensing data signal further comprises:

in a case of no illumination, generating, by the light-sensing element, a dark current which is the sensing data signal; and in a case of illumination, further generating, by the light-sensing element, a photo-generated current, and the sensing data signal comprises the dark current and the photo-generated current.

6. A display panel, comprising a plurality of pixel circuits, wherein at least some of the plurality of pixel circuits each comprises:

a light-emitting element;

a first voltage terminal;

a data signal line;

a light emission control sub-circuit, connected with the first voltage terminal, the data signal line and the light-emitting element; and a photoelectric sensing sub-circuit, connected with the first voltage terminal and the data signal line;

wherein, in a first time period, the data signal line is configured to transmit a display data signal which is configured to control the light emission control sub-circuit to provide a drive current for the light-emitting element;

in a second time period, the data signal line is configured to transmit a sensing data signal obtained by the photoelectric sensing sub-circuit;

wherein the photoelectric sensing sub-circuit comprises a light-sensing element and a switching element, and the light-sensing element and the switching element are connected in series between the first voltage terminal and the data signal line;

in the first time period, the switching element is in an open state; and in the second time period, the switching element is in a closed state;

wherein the light-sensing element is a first transistor, which is in the open state;

wherein the light emission control sub-circuit comprises a data write sub-circuit, a drive sub-circuit, and a reset sub-circuit;

the data write sub-circuit comprises a data signal input terminal for receiving the display data signal and a first power supply signal input terminal for receiving a first power supply signal, the data write sub-circuit is connected with a connection node which is connected with the drive sub-circuit, and the data signal input terminal is connected with the data signal line;

the drive sub-circuit is connected with the first power supply signal input terminal and the light-emitting element, and configured to provide a drive current for the light-emitting element;

the light-emitting element is further connected with a second power supply signal input terminal for receiving a second power supply signal; the second power supply signal has a lower level than the first power supply signal; and the reset sub-circuit comprises a reset control terminal for receiving a reset signal and a third power supply signal input terminal for receiving a third power supply signal, the reset sub-circuit is connected with the connection node; and the third power supply signal has a lower level than the first power supply signal;

wherein the reset sub-circuit completes a reset by inputting the third power supply signal into the light-emitting element and the data write sub-circuit;

wherein the switching element of the photoelectric sensing sub-circuit is a second transistor;

wherein a first electrode of the first transistor is connected to the first voltage terminal, and a second electrode of the first transistor is connected to a gate electrode of the first transistor and a second electrode of the second transistor;

wherein a gate electrode of the second transistor is connected to a switching control terminal to receive a switching control signal, and a first electrode of the second transistor is directly connected to the data signal input terminal of the data write sub-circuit.

7. The display panel of claim 6, wherein the first voltage terminal is configured to provide the first power supply signal, and the first power supply signal input terminal is connected with the first voltage terminal;

the gate electrode of the first transistor is configured to input a switch-off signal for controlling the first transistor to be in the open state.

* * * * *